(12) United States Patent
Payne et al.

(10) Patent No.: US 9,507,348 B2
(45) Date of Patent: Nov. 29, 2016

(54) AUTO-CALIBRATION OF AUTOMATIC GRADE CONTROL SYSTEM IN A WORKING MACHINE

(71) Applicant: Roadtec, Inc., Chattanooga, TN (US)

(72) Inventors: Byron Payne, Chattanooga, TN (US); Jeffery A. Ensell, Fayetteville, GA (US)

(73) Assignee: Roadtec, Inc., Chattanooga, TN (US)

( * ) Notice: Subject to any disclaimer, the term of this patent is extended or adjusted under 35 U.S.C. 154(b) by 0 days.

(21) Appl. No.: 15/019,203

(22) Filed: Feb. 9, 2016

(65) Prior Publication Data

US 2016/0231752 A1    Aug. 11, 2016

Related U.S. Application Data (60) Provisional application No. 62/114,656, filed on Feb. 11, 2015.

(51) Int. Cl.
*G06F 7/70*    (2006.01)
*G05D 1/04*    (2006.01)
*E01C 23/08*   (2006.01)

(52) U.S. Cl.
CPC .............. *G05D 1/04* (2013.01); *E01C 23/08* (2013.01)

(58) Field of Classification Search
None
See application file for complete search history.

(56) References Cited

U.S. PATENT DOCUMENTS

| | | | |
|---|---|---|---|
| 3,029,715 A | 4/1962 | Bowen | |
| 4,795,113 A * | 1/1989 | Minovitch | B64G 5/00 104/138.1 |
| 5,184,293 A | 2/1993 | Middleton et al. | |
| 5,430,651 A | 7/1995 | Nielsen et al. | |
| 5,472,056 A * | 12/1995 | Orbach | A01B 63/1117 172/2 |
| 5,484,227 A | 1/1996 | Ikeda et al. | |
| 7,946,788 B2 | 5/2011 | Jurasz et al. | |
| 8,113,592 B2 | 2/2012 | Busley et al. | |
| 8,308,395 B2 | 11/2012 | Jurasz et al. | |
| 8,511,932 B2 | 8/2013 | Jurasz et al. | |
| 8,690,474 B2 | 4/2014 | Jurasz et al. | |
| 8,794,867 B2 | 8/2014 | Snoeck et al. | |
| 8,899,689 B2 | 12/2014 | Killion | |
| 9,010,871 B2 | 4/2015 | Busley et al. | |
| 2002/0098039 A1 | 7/2002 | Kieranen et al. | |
| 2010/0196096 A1 | 8/2010 | Halonen et al. | |
| 2014/0107892 A1 | 4/2014 | Coombs et al. | |
| 2015/0328948 A1 | 11/2015 | Busley et al. | |

* cited by examiner

*Primary Examiner* — Adam Alharbi
(74) *Attorney, Agent, or Firm* — Chambliss, Bahner & Stophel, P.C.

(57) ABSTRACT

A working machine such as a road milling machine of an asphalt paving machine has an automatic grade and slope control system that causes the machine to maintain a pre-selected grade and slope with respect to a reference without significant operator input. A calibration system employs a calibration controller to calibrate the automatic grade and slope control system. The calibration controller causes a current to be sent to a valve that operates a linear actuator that may be employed to change the attitude of the frame of the working machine. The calibration controller uses feedback from at least one sensor, such as a height-measuring sensor or a slope-measuring sensor, in an iterative process that determines the minimum current necessary to cause a change in the attitude of the frame of the working machine. Once this minimum value is determined, the system will establish the optimum settings for the automatic grade and slope control system to improve its efficiency and cause it to operate more smoothly.

14 Claims, 6 Drawing Sheets

AUTO-CALIBRATION OF AUTOMATIC GRADE CONTROL SYSTEM IN A WORKING MACHINE

CROSS-REFERENCE TO RELATED APPLICATION

This application claims the benefit of U.S. Provisional Patent Application No. 62/114,656, which was filed on Feb. 11, 2015.

FIELD OF THE INVENTION

This invention relates to a system and method for automatically calibrating an automatic grade control system for a working machine such as a milling machine or an asphalt paving machine. More specifically, the invention comprises a system and method for automatically determining the minimum current necessary to cause a change in the transverse and/or longitudinal attitude of a working machine.

BACKGROUND AND DESCRIPTION OF THE PRIOR ART

Roadwork is typically carried out by working machines that carry a working implement and travel along a roadway. In the operation of road milling machines and paving machines, it is critical to control the transverse slope and/or the longitudinal grade of the working implement with respect to the roadway. Consequently, conventional road working machines include grade and slope controls that can be used to insure that the working implement will be disposed and will remain disposed at a desired level both along and across the roadway being worked.

Roadway repair is often accomplished by overlaying the existing pavement (whether of concrete or asphalt composition) with a new layer (often called a leveling course) of concrete, asphalt or other surfacing materials. Without prior surface treatment, however, this method of repair generally results in the application of insufficient quantities of paving material in the rutted, potholed or otherwise damaged areas, because the overlay will be applied at the same rate per unit of roadway width in damaged areas (which have a greater depth across the width) as in the undamaged areas. The resulting reduced density in the overlay of the previously damaged areas will lead to renewed rutting or other wear damage in the new pavement in relatively short order. However, by milling the surface of the damaged pavement to a flat surface, the damaged areas will be removed so that newly added pavement will have a uniform thickness across the entire width of the roadway. In addition, a repaving technique that includes milling a thickness of old pavement and replacing it with an equivalent thickness of new pavement will return the elevation of the roadway to its initial level, whereas the placement of a leveling course atop damaged pavement will tend to raise the surface of the roadway or some portion thereof above its original elevation. This can require the raising of road shoulders, guardrails and manhole covers and the adjustment of overpass clearances, all of which is unnecessary if a proper milling technique is employed. A use of milling prior to repaving can also permit ready establishment of the proper road grade and slope, and thereby avoid drainage and safety problems. Furthermore, milling typically provides a rough surface that readily accepts and bonds with the new asphalt or other pavement overlay. Finally, milling can provide raw material that can be reclaimed for use in the production of new paving materials.

A milling machine is typically a wheeled or track-driven vehicle that is provided with a rotating working drum that includes a plurality of cutting teeth. The drum is mounted in a housing on the frame of the machine and adapted to be lowered into contact with the road surface and rotated about a horizontal axis so as to cut into the surface to a desired depth as the machine is advanced along the roadway. Generally, the milling machine also includes a conveyor system that is designed to carry the milled material that has been cut from the roadway by the rotating drum to a location in front of, to the rear of or beside the machine for deposit into a truck for removal from the milling site. One or more spray bars are typically mounted over the conveyors and inside the drum housing so that water may be sprayed to control the dust and heat that is generated in the milling process. In addition, a vacuum system may be provided to assist in removing dust generated in the milling process. Steerable track or wheel drive assemblies are provided to drive the machine and to steer it along a desired milling path. Power for driving the machine and for operating its systems is typically provided by a diesel engine.

It is common for the track or wheel drive assemblies of a milling machine to be mounted at the bottom of vertical columns, and for the frame which carries the milling drum to be adjustable upwardly and downwardly on the columns to change the depth of cut of the milling drum with respect to the surface on which the track or wheel drive assemblies rest. Linear actuators are provided to move the frame with respect to the columns, and sensors are provided to scan the surface of the roadway to provide accurate information about the location of the milling drum or the frame with respect to the surface to be milled Conventional milling machines include a grade and slope control system that can be used to insure that the milling drum will be disposed at a desired level both along and across the roadway being milled as the milling machine is operated. A level milled surface is critical in obtaining a smooth and level paved surface.

When the milling operation has been completed, paving of the roadway with asphalt material is generally carried out by a paving machine that is supplied with asphalt material by a number of supply trucks and/or a material transfer vehicle. The paving machine is self-propelled and driven by a wheeled or tracked drive system. In a common type of paving machine, an asphalt receiving hopper is located at the front end of the machine to receive asphalt material from a truck or material transfer vehicle, and a hopper conveyor typically comprised of one or more slat conveyors located below the asphalt receiving hopper transfers the asphalt material from the hopper to a transverse distributing auger that is mounted near the rear of the machine. The asphalt material is deposited onto and across the roadway or other surface to be paved by the distributing auger. A floating screed located at the rear end of the machine behind the distributing auger compacts the asphalt material and forms the asphalt mat. The floating screed is attached to the paving machine by a pair of tow arms, and a linear actuator is typically provided at the front of each tow arm to adjust the elevation of the floating screed.

As has been mentioned, it is known to provide systems for adjusting and controlling the attitude of the frame (and thus, the elevation and slope of the milling drum) on the front columns that support the drive assemblies of a milling machine. It is also known to provide similar systems for adjusting and controlling the attitude of the screed of an asphalt paving machine. Two closed-loop control systems are typically provided, one for the left front column of the milling machine or the left front tow arm of the paving machine, and the other for the right front column or right front tow arm. Each system includes a depth measuring sensor which measures the distance from the roadway surface to a reference point on the frame of the working machine, and an operator may cause signals to be transmitted to the linear actuators on each of the front locations to adjust the distance of the milling drum or screed from the roadway surface. Each of these linear actuators is operated by an electrically powered valve, and the minimum electrical current that is required to cause the valves to operate the linear actuators in order to affect the attitude of the frame of a working machine varies considerably. It is necessary to calibrate the system to set this minimum electrical current for each linear actuator in order to insure smooth and efficient operation of the attitude control system. However, it is a time-consuming matter to calibrate the conventional systems for grade and slope control in the conventional manner prior to beginning a milling or paving operation. Furthermore, conventional calibration techniques for attitude control systems require significant operator training.

It would be desirable if an automatic system could be provided to insure that calibration of the grade and slope control systems for a working machine can be accomplished quickly and by minimally trained operators.

Advantages of a Preferred Embodiment of the Invention

Among the advantages of a preferred embodiment of the invention is that it provides a system for automatically calibrating the grade and slope control systems for a working machine. Additional objects and advantages of this invention will become apparent from an examination of the drawings and the ensuing description.

Notes on Construction

The use of the terms "a", "an", "the" and similar terms in the context of describing the invention are to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. The terms "substantially", "generally" and other words of degree are relative modifiers intended to indicate permissible variation from the characteristic so modified. The use of such terms in describing a physical or functional characteristic of the invention is not intended to limit such characteristic to the absolute value which the term modifies, but rather to provide an approximation of the value of such physical or functional characteristic. All methods described herein can be performed in any suitable order unless otherwise specified herein or clearly indicated by context.

The use of any and all examples or exemplary language (e.g., "such as" and "preferably") herein is intended merely to better illuminate the invention and the preferred embodiments thereof, and not to place a limitation on the scope of the invention. Nothing in the specification should be construed as indicating any element as essential to the practice of the invention unless so stated with specificity. Several terms are specifically defined herein. These terms are to be given their broadest possible construction consistent with such definitions, as follows:

The terms "above", "upper" and similar terms, when used with respect to a working machine or a component of a working machine, refer to a relative location or direction away from the surface on which the machine is operated.

The terms "below", "lower" and similar terms, when used with respect to a working machine or a component of a working machine, refer to a relative location or direction towards the surface on which the machine is being operated.

The terms "front", "forward" and similar terms, when used with respect to a working machine or a component of a working machine, refer to a relative location or direction towards the leading end of the working machine as it travels during operation.

The term "rear" and similar terms, when used with respect to a working machine or a component of a working machine, refer to a relative location or direction towards the trailing end of the working machine as it travels during operation.

The term "working direction" refers to the direction of travel of the working machine as it operates.

The term "left", as used herein to indicate a side of a working machine or in reference to a component on one side of a working machine, refers to a position or orientation towards the left, from the perspective of an observer who is observing in the working direction.

The term "right", as used herein to indicate a side of a working machine or in reference to a component on one side of a working machine, refers to a position or orientation towards the right, from the perspective of an observer who is observing in the working direction.

The term "frame" means the structural part of a working machine that supports its working implement and to which a linear actuator that may be employed to change the elevation and/or slope of the working implement is attached.

The term "attitude" means the transverse and/or longitudinal position of the frame of the working machine with respect to a reference plane or surface. The term "attitude" may describe the relative orientation of the frame of the working machine with respect to one or both of the grade and slope of the roadway on which the working machine is working.

The term "linear actuator" refers to an electric, hydraulic, electro-hydraulic, pneumatic or mechanical device that generates force which is directed in a straight line. One common example of a "linear actuator" is a double-acting hydraulic actuator which includes a cylinder, a piston within the cylinder, and a rod attached to the piston. By increasing the pressure within the cylinder on one side of the piston (over that on the opposite side of the piston), the rod will extend from the cylinder or retract into the cylinder.

SUMMARY OF THE INVENTION

The invention comprises a method and apparatus for automatically calibrating the grade and slope control system of a working machine. The invention includes a calibration controller that sends electrical current to the valves that operate the linear actuators which affect the attitude of the frame of a working machine. Such linear actuators may be located in the front columns of a milling machine or at the tow points for the screed of an asphalt paving machine. The controller performs the steps of an iterative process to determine a minimum change in slope with iterative changes in current sent to the valve for both the linear actuator raise direction and the linear actuator lower direction on both the left and right sides of the working machine.

Conventional working machines typically have an automatic grade and slope control system that causes the machine to maintain a pre-selected grade and slope with respect to a reference without significant operator input. The invention comprises a system that calibrates the automatic grade and slope control system for a working machine. The invention employs a calibration controller that is adapted to cause a current to be sent to a valve that operates a linear actuator that may be employed to change the attitude of the frame of the working machine. The invention uses feedback from at least one sensor, such as a height-measuring sensor or a slope-measuring sensor, in an iterative process that determines the minimum current necessary to cause a change in the attitude of the frame of the working machine. Once this minimum value is determined, the system will establish the optimum settings for the automatic grade and slope control system to improve its efficiency and cause it to operate more smoothly.

In order to facilitate an understanding of the invention, a preferred embodiment of the invention is illustrated in the drawings, and a detailed description thereof follows. It is not intended, however, that the invention be limited to the particular embodiment described or to use in connection with the particular apparatus illustrated herein. Various modifications and alternative embodiments such as would ordinarily occur to one skilled in the art to which the invention relates are also contemplated and included within the scope of the invention described and claimed herein.

BRIEF DESCRIPTION OF THE DRAWINGS

The presently preferred embodiment of the invention is illustrated in the accompanying drawings, in which like reference numerals represent like parts throughout, and in which.

DESCRIPTION OF THE PREFERRED EMBODIMENTS OF THE INVENTION

As shown in FIGS. 1-4, a milling machine that may be equipped with a preferred embodiment of the present invention is indicated generally at 20. This machine comprises a mobile vehicle having a frame 22 and a plurality of ground-engaging drive assemblies, including right front track assembly 24, which is mounted on column 26, right rear track assembly 28, which is mounted on column 30, left front track assembly 32, which is mounted on a column (not shown, but substantially similar to columns 26, 30 and 36) and left rear track assembly 34, which is mounted on column 36. As is conventional, linear actuators within the columns (not shown) are adapted to raise and lower the frame of the milling machine with respect to the surface being milled Preferably, the front drive assemblies are steerable to provide precise directional control. The drive assemblies of machine 20 are driven by a machine drive system including conventional hydraulic motors (not shown) and an engine (also not shown) to advance the machine across the surface of a roadway, parking lot or other surface to be milled in the working direction (or milling direction) indicated by arrow M. Milling machine 20 also includes a milling assembly comprising a generally cylindrical milling drum (not shown) having a plurality of cutting teeth. The milling drum is mounted for rotation on the frame and is adapted for cutting a width of material from the surface in the path of the machine.

Figure 1:
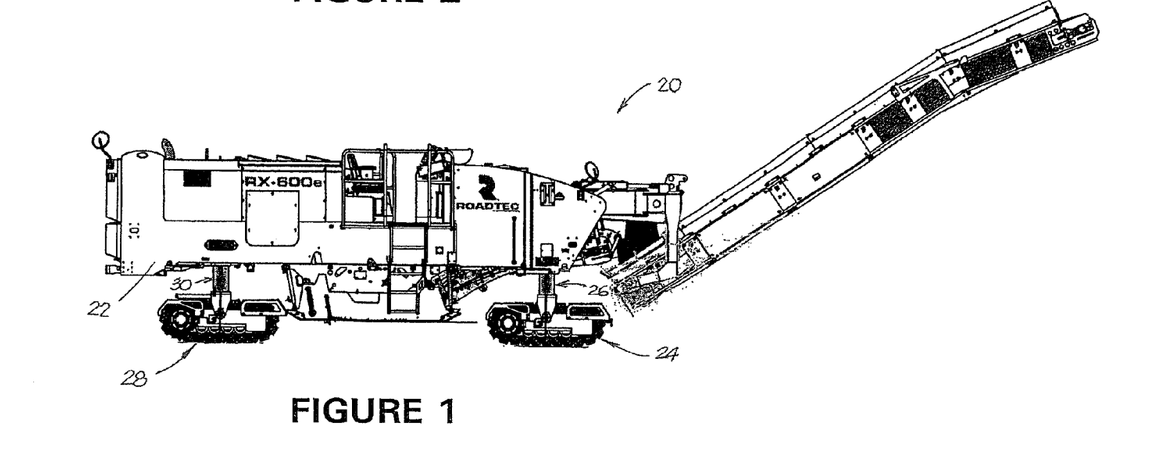
FIG. 1 is a side view of a milling machine to which the invention may be applied.
Figure 2:
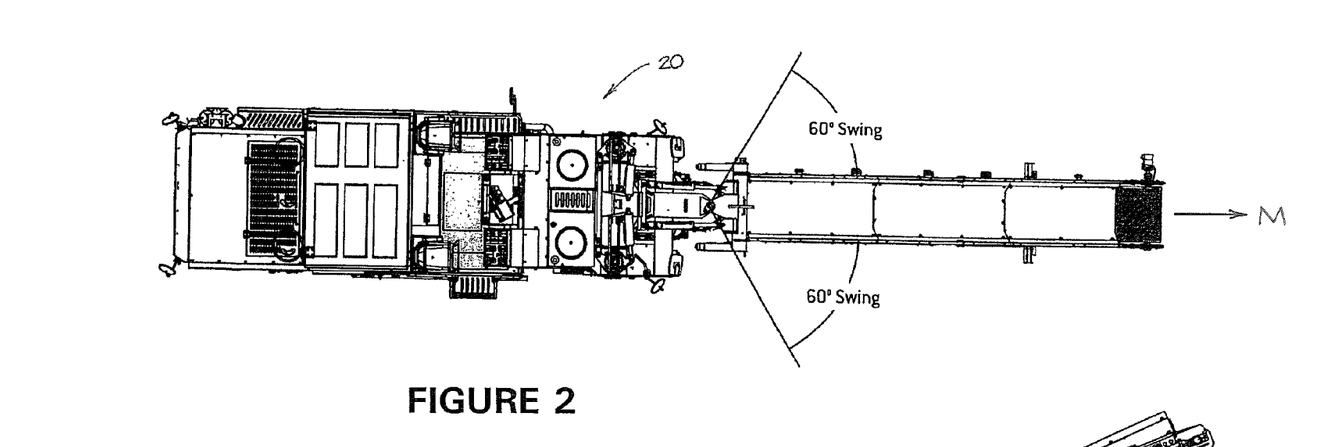
FIG. 2 is a top view of the milling machine illustrated in FIG. 1.
Figure 3:
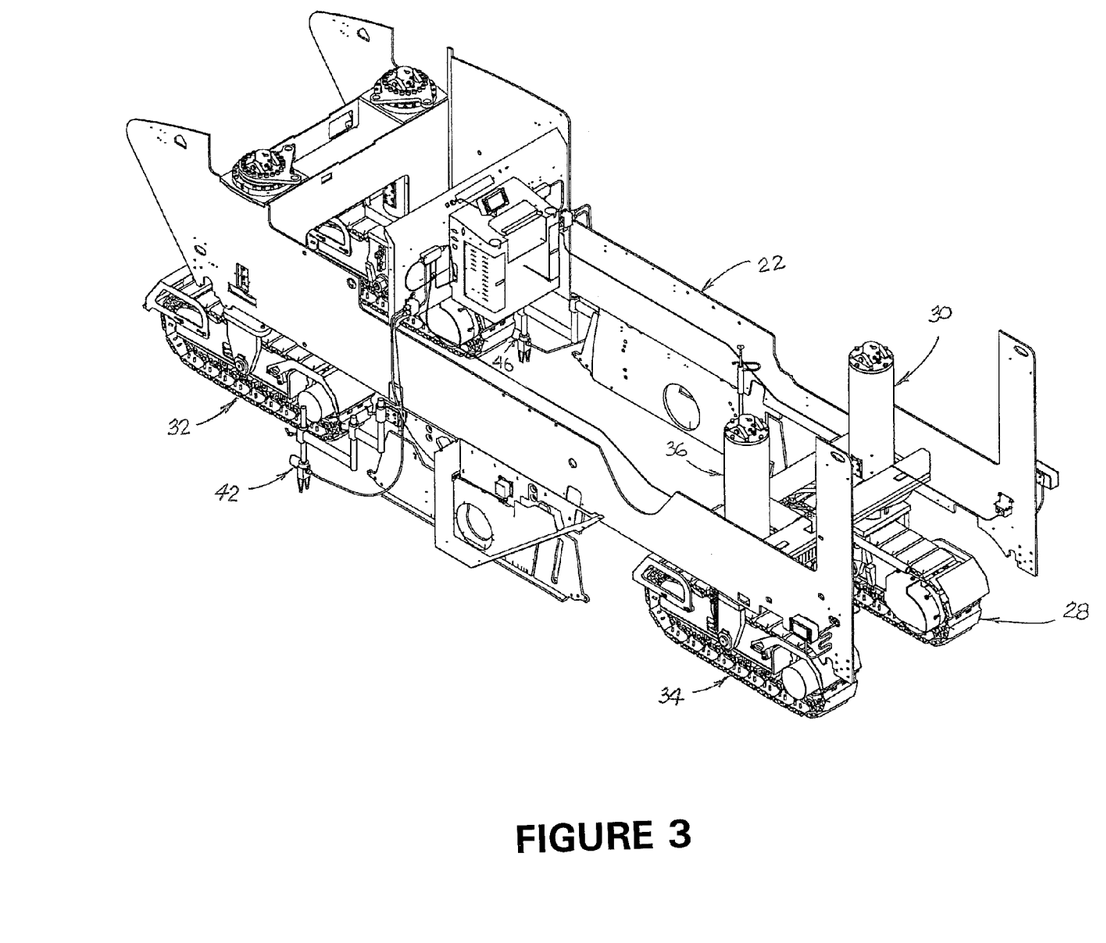
FIG. 3 is a perspective view of the frame of the milling machine illustrated in FIGS. 1 and 2, showing some of the components used in connection with the invention.
Figure 4:
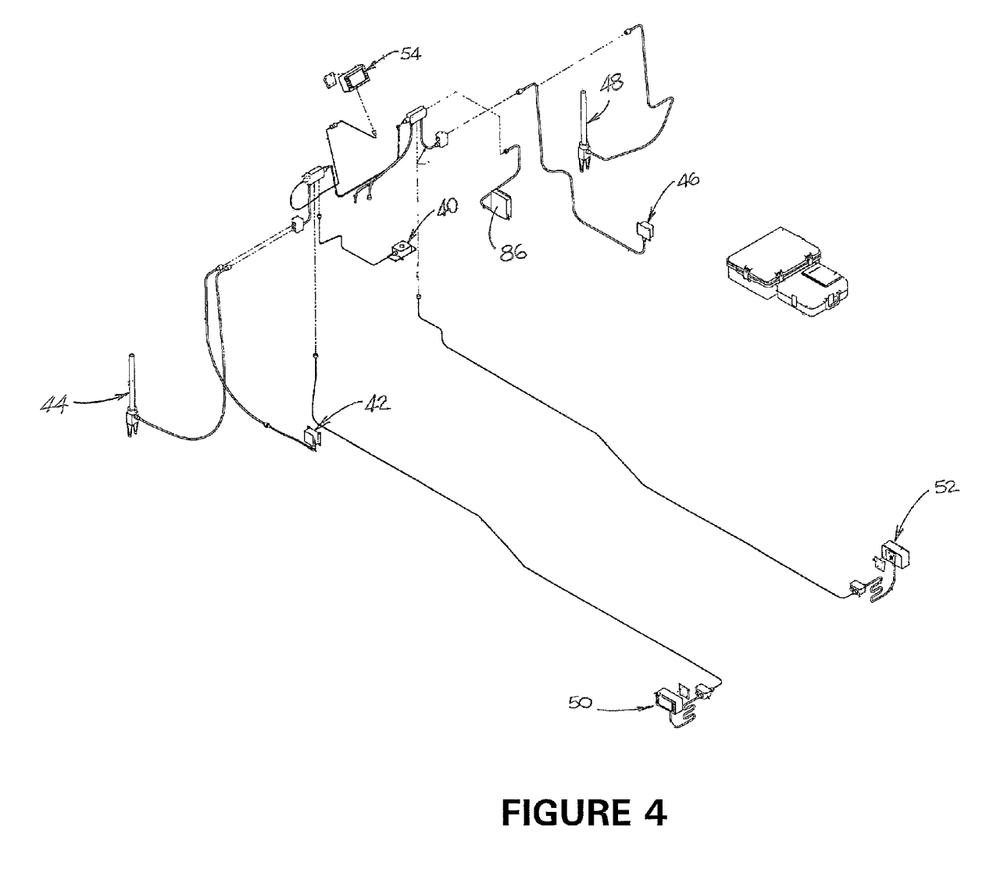
FIG. 4 is a perspective view of the components used in connection with the invention, showing their relative positions with respect to the frame of the milling machine of FIGS. 1-3 on which they are mounted.
Figure 5:
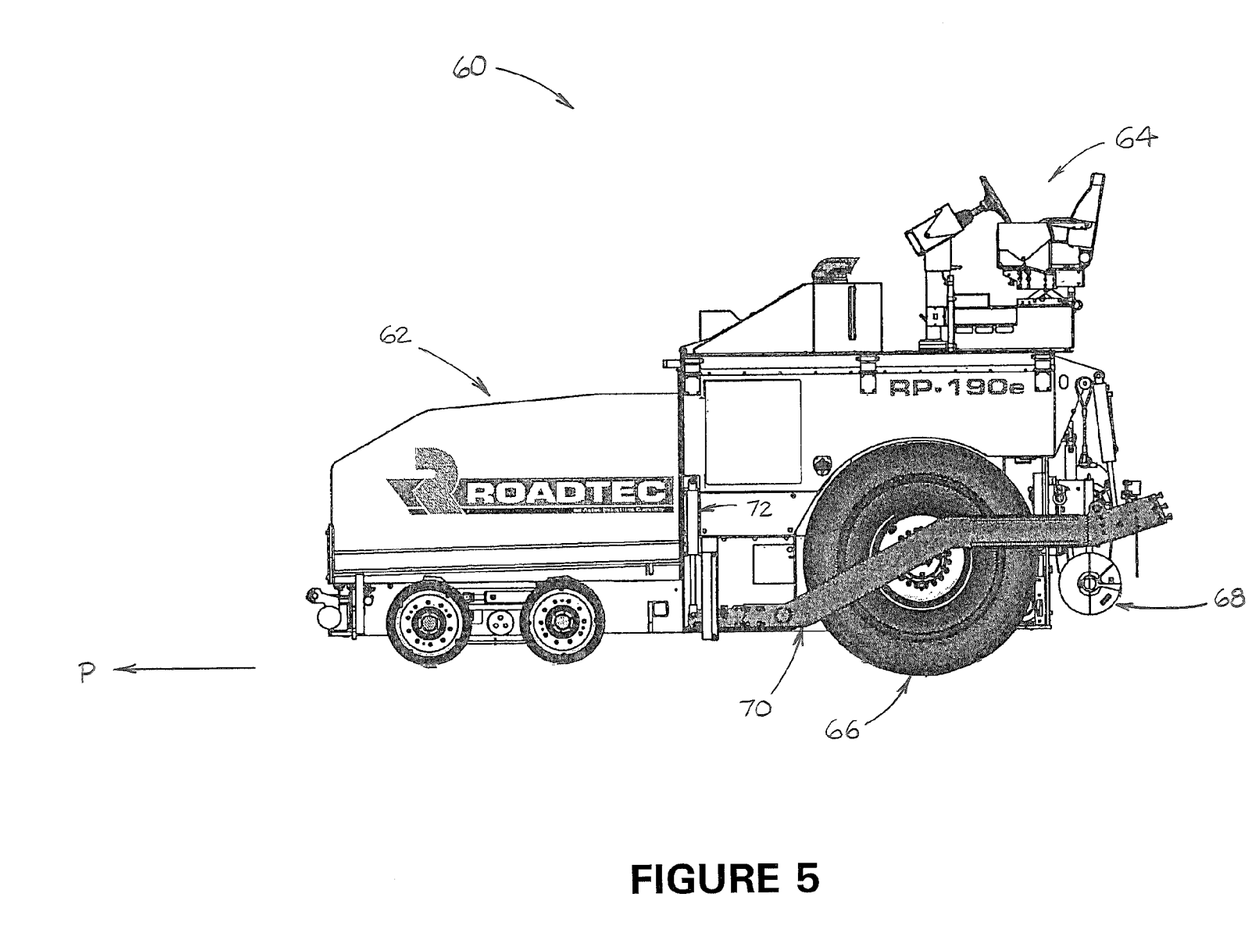
FIG. 5 is a side view of an asphalt paving machine to which the invention may be applied.
Figure 6:
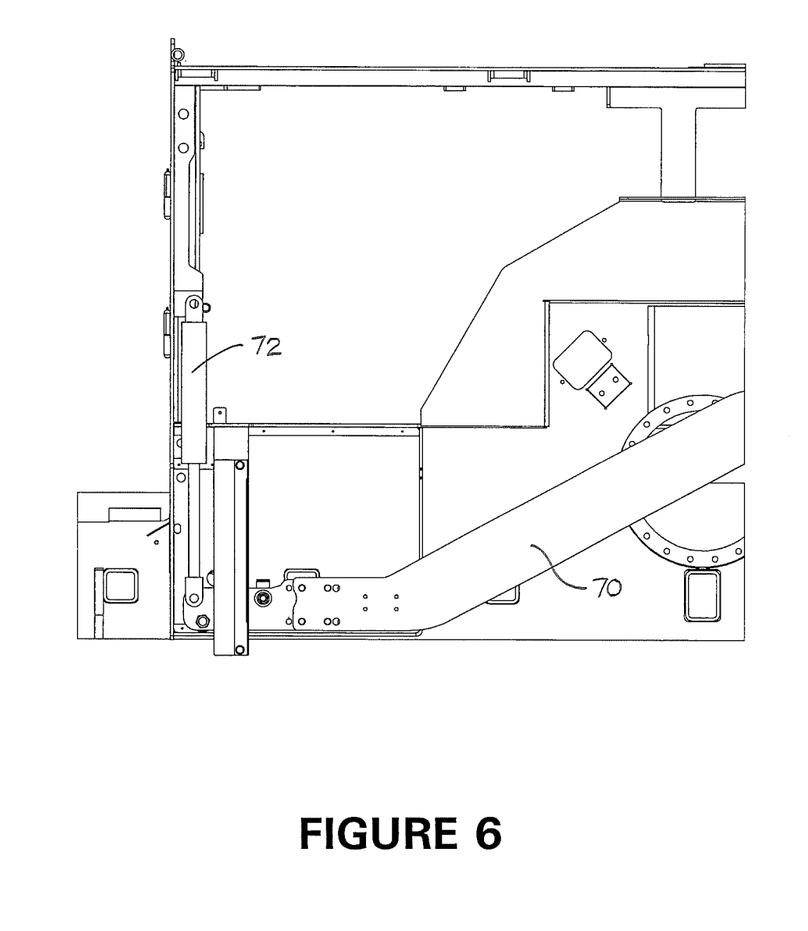
FIG. 6 is an enlarged view of a portion of the asphalt paving machine of FIG. 5, showing the left side linear actuator that is mounted at the front of the left side tow arm.
Figure 7:
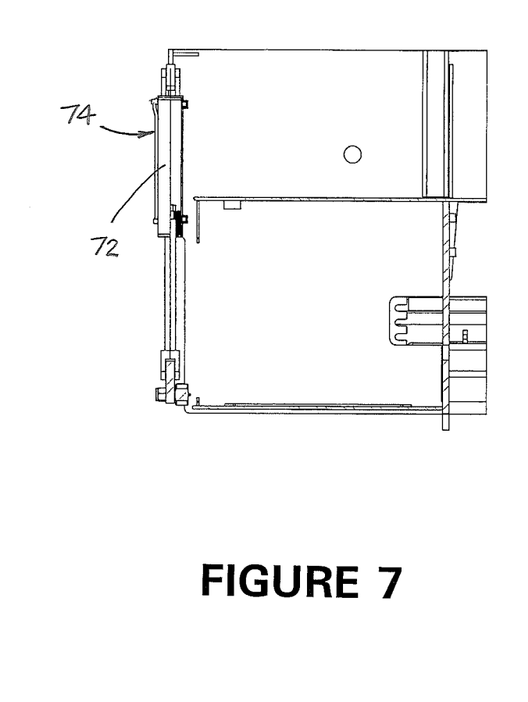
FIG. 7 is an end view of the linear actuator that is mounted at the front of the left side tow arm of the asphalt paving machine of FIGS. 5 and 6.

Milling machine 20 is provided multiple conventional sensors that are employed in connection with its automatic grade and slope control system. In the embodiment of the invention illustrated in the drawings, these sensors include an ultrasonic slope sensor and a pair of wire rope sensors. Slope sensor 40 is mounted at a lateral midpoint on the frame of the machine (shown in FIG. 4) and is adapted to measure the cross-slope (i.e., transversely to the milling direction) of the frame with respect to the horizon. Left side wire rope sensor 42, which is mounted in bracket 44, and right side wire rope sensor 46, which is mounted in bracket 48, are adapted for measuring distance to the roadway surface from a reference point on the frame. Associated with these conventional sensors are three identical display modules, left rear display 50, right rear display 52 and operator's station display 54. In the embodiment of the invention illustrated in the drawings, one or more of sensors 40, 42 and 46 are also used in connection with the calibration system for both the left side and right side front column linear actuators that raise and lower the frame of machine 20 with respect to the surface being milled FIGS. 5-7 illustrate paving machine 60, which includes asphalt receiving hopper 62 at its front end for receiving asphalt material from a dump truck or material transfer vehicle. Paving machine 60 also includes left operator's station 64 and a right operator's station (not shown, but substantially similar to left operator's station 64). A pair of drive wheels (one of which, wheel 66, is illustrated in FIG. 5) are driven by an engine (not shown) so as to move the paving machine during the paving operation in the working direction (or paving direction) indicated by arrow P. The bottom of asphalt receiving hopper 62 is open, exposing a hopper conveyor (not shown) that is mounted below the hopper. This conveyor transports asphalt material from asphalt receiving hopper 62 through a conveyor tunnel under the engine and operator's stations to transverse distributing auger 68 that is located near the rear end of paving machine 60. Transverse distributing auger 68 is adapted to distribute the asphalt material received from the hopper across the width of the roadway or lane to be paved. A floating screed (not shown) is attached to the paving machine by a pair of tow arms, one of which, left tow arm 70, is illustrated in FIGS. 5 and 6. The screed serves to compact the asphalt material and form an asphalt mat on the roadway. Mounted between the frame of paving machine 60 and the front end of the tow arms are a pair of linear actuators (one of which, actuator 72, is illustrated in FIGS. 5-7). These linear actuators are employed by the automatic control system to maintain the attitude of the frame with respect to the screed assembly during paving operations. As shown in FIG. 7, linear transducer 74, such as the external linear transducer sold by Rota Engineering Ltd of Manchester, UK, is mounted on actuator 72 and adapted to measure a distance corresponding to the distance between the frame of the machine and the surface that is being paved.

Figure 8:
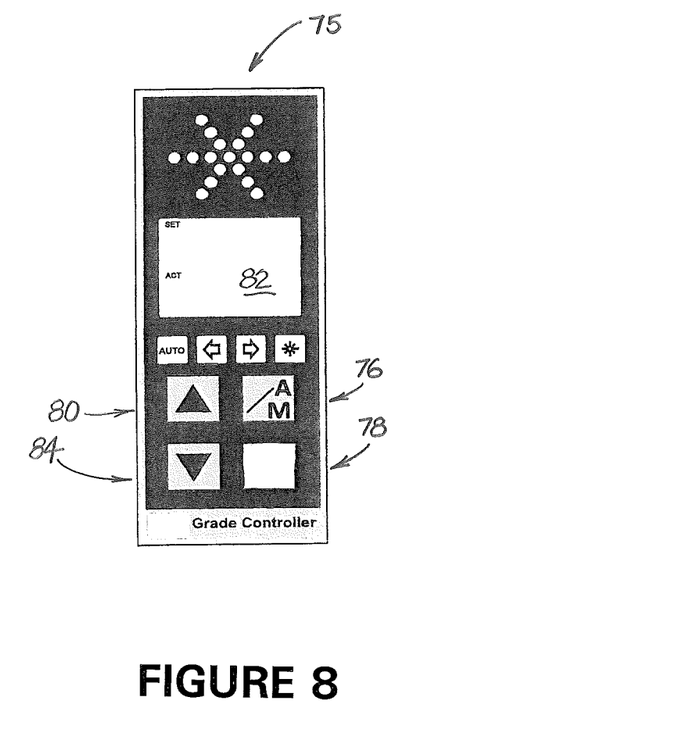
FIG. 8 is a front view of a control panel for a preferred automatic control system that may be calibrated by operation of the invention.

In the preferred embodiment illustrated and described herein, the invention is employed with a conventional MOBA™ brand grade and slope control system that is sold by MOBA Mobile Automation AG of Limburg, Germany. However, the invention is not limited to employment with the MOBA™ system, and in fact may be employed with other grade and slope control systems as are known to those having ordinary skill in the art to which the invention relates. In order to calibrate the MOBA™ system by the conventional method (i.e., before it is modified to incorporate the invention), the following steps must be taken by manipulating the control panel 75 of the MOBA™ system (shown in FIG. 8) for each of the LEFT Grade Controller and the RIGHT Grade Controller. Starting with the LEFT Grade Controller and the working machine in a parked position:

1. Press button 76 (labeled "A/M") and button 78 (directly below button 76) simultaneously.
2. Use the up arrow 80 to select "slope" from the options shown in display 82.
3. Press button 78 until TYPE "2" is shown in display 82. Use the up arrow 80 and the down arrow 84 if necessary to display "2".
4. Press button 78 and null out the slope sensor.
5. Press button 76 twice. This should show "automatic" and "A" on a grade bar in display 82.
6. Press button 76 and button 78; hold button 78 until "PA" appears in display 82.
7. Press button 78, down button 84 and then up button 80.
8. Press button 78 to select "MIN Current UP".
9. Use down button 84 to reduce the number displayed adjacent to "MIN Current UP" to "10".
10. Press button 78 to select "MIN Current DN".
11. Use down button 84 to reduce the number displayed adjacent to "MIN Current DN" to "10".
12. Press button 76 to select "MIN Current UP".
13. Manually lower the frame on the front left column 30 by about two inches and wait for the machine to recover to grade, as indicated by a flashing up button 80.
14. Press and hold the up button 80 increasing the number adjacent to "MIN Current UP" until the machine comes to grade and stops.
15. Press button 78 to select "MIN Current DN".
16. Manually raise the frame on the front left column 30 by about two inches and wait for the machine to recover to grade, as indicated by a flashing down button 84.
17. Press and hold up button 80 to increase the number adjacent to "MIN Current DN" until the machine comes to grade and stops.
18. Press button 76 once and record the number adjacent to "MIN Current UP".
19. Press button 78 and record the number adjacent to "MIN Current DN".
20. Press button 78 to select "MAX Current UP". Use up button 80 and down button 84 to display a number for "MAX Current UP" that is equal to the recorded "MIN Current UP" number plus 7.
21. Press button 78 and select "MAX Current DN". Use the up button 80 and down button 84 to display a number for "MAX Current DN" that is equal to the recorded "MIN Current DN" number plus 7.
22. Manually move the machine up and down to watch the machine for overshooting. Adjust "MIN Current UP", "MIN Current DN", "MAX Current UP" and "MAX Current DN" as needed using up button 80 and down button 84 to insure the machine recovers to grade without overshooting.
23. Hold button 76 until the working display is shown.
24. Press button 76 and button 78.
25. Press button 78 to select "TYPE". Use up button 80 and down button 84 to display "1" adjacent to "TYPE". Hold button 78 until "PA" appears in the working display 82. Press button 78, down button 84 and up button 80.
26. Press button 78 to select "MIN Current UP". Use up button 80 and down button 84 to enter the previously recorded number for "MIN Current UP".
27. Press button 78 to select "MIN Current DN". Use up button 80 and down button 84 to enter the previously recorded number for "MIN Current DN".
28. Press button 78 to select "MAX Current UP". Use up button 80 and down button 84 to enter a number that is equal to the recorded "MIN Current UP" number plus 15.
29. Press button 78 to select "MAX Current DN". Use up button 80 and down button 84 to enter a number that is equal to the recorded "MIN Current DN" number plus 15.
30. Hold button 76 to select the working display.
31. Repeat steps 1-30 for the RIGHT Grade Controller.

As can be appreciated, the conventional calibration process is complicated and time-consuming. It requires 30 separate steps for each of the left and right sides of the machine. Furthermore, it requires that the operator be trained to properly accomplish it. In contrast, the auto-calibration system of the invention is much simpler and can be carried out quickly by an operator with minimum calibration training. The auto-calibration system takes advantage of the fact that electrical current applied to the valve that operates the linear actuator in a front column is proportional to the speed at which the linear actuator extends or retracts. The automatic calibration system will preferably perform the steps of the process for both the linear actuator raise direction and the linear actuator lower direction on both the left and right sides of the working machine. When the auto-calibration sequence is initiated for either the left or the right side, the system carries out an iterative process to determine changes in the measured slope of the machine as the electrical current sent to the valve for the linear actuator for a front column is ramped up. The system will determine the previous transverse slope of the machine and cause a predetermined electrical current of known value to be transmitted to the valve that operates the linear actuator for the selected side of the machine for a short period of time. The system will then determine the current transverse slope of the machine and compare the current slope with the previous slope. If the difference is outside of a predetermined range, the system infers that the linear actuator has moved. If the difference is not outside the predetermined range, the system will increment the minimum current value and determine the previous slope of the machine. It will again cause an electrical current to be transmitted to the valve for the linear actuator for the selected side of the machine for a short time, and will again determine the current transverse slope of the machine. The current and previous slopes will again be compared. This process will be repeated incrementally until the minimum current value necessary to cause a change in the attitude of the frame of the machine is obtained for each of the left side UP, left side DOWN, right side UP and right side DOWN actuator operations.

The invention comprises a calibration system for an automatic attitude control system for a working machine having a frame, a left side linear actuator that is actuated by a left side electrically operated valve for adjusting the attitude of the frame of the machine, and a right side linear actuator that is actuated by a right side electrically operated valve for adjusting the attitude of the frame of the machine. The automatic attitude control system typically includes a controller such as controller 86 shown in FIG. 4, for automatically actuating the left side linear actuator and/or the right side linear actuator of the working machine to maintain a predetermined attitude of the frame. The invention comprises a calibration system that includes a calibration controller which may comprise a separate calibration controller that is operatively connected to the conventional automatic grade and slope control system, or it may comprise re-programming or modifying the programming for the existing controller (such as controller 86) for the existing automatic grade and slope control system. The calibration system uses at least one sensor that is adapted to determine if the actuation of either the left side linear actuator or the right side linear actuator has caused a change in the attitude of the frame of the machine. Such sensor or sensors are typically those employed in the conventional automatic grade and slope control system. Consequently, the sensor or sensors used in the calibration system may include one or more conventional sensors for measuring distance to the roadway surface from a reference point on the frame, such as wire rope sensor 42 and wire rope sensor 44 (shown in FIG. 4), and/or a grade sensor, such as ultrasonic grade sensor 48.

The calibrating controller must be operatively connected to the sensor or sensors to be employed, such as one or more of sensors 42, 44 and 48. It must also be operatively connected to the conventional left side electrically operated valve that actuates the left side linear actuator, and to the conventional right side electrically operated valve that actuates the right side linear actuator. The calibration controller is adapted to cause one or more sequential electrical currents to be sent to the left side electrically operated valve, to determine, based on input from at least one sensor, if any such electrical current has caused a change in the attitude of the frame of the machine, and to determine a left side sequence count of the number of times that an electrical current that was caused to be sent to the left side electrically operated valve failed to cause a change in the attitude of the frame of the machine.

Preferably, the invention includes a left side switch (such as one or a combination of switches on control panel 75) that is operatively connected to the calibrating controller and adapted to initiate the left side calibration sequence. The calibrating controller then initiates a left side calibration sequence by causing a predetermined minimum electrical current to be sent to the left side electrically operated valve. In the preferred embodiment of the invention that is employed in connection with the conventional MOBA™ grade and slope control system, the predetermined minimum electrical current that is sent to the left side electrically operated valve in order to initiate a left side calibration sequence is equal to 100 mA. The calibration controller then compares a frame attitude measurement from one or more sensors after the transmission of the predetermined minimum electrical current to a reference measurement taken prior to the transmission of such predetermined minimum electrical current to determine if there has been a change in the attitude of the frame of the machine. If so, the calibration controller communicates to the automatic attitude control system (i.e., the MOBA™ control system) a left side electrical current set point equal to the amount of electrical current that was sent to the left side electrically operated valve which was determined by input from the at least one sensor to cause a change in the attitude of the frame of the machine. This will cause the MOBA™ control system to begin adjustments of the attitude of the frame of the machine during operation of the machine with the set point value of electrical current, insuring smooth, fast and efficient operation of the attitude control system.

However, if the predetermined minimum electrical current did not cause a change in the attitude of the frame of the machine, the calibration controller will continue the left side calibration sequence by generating a left side sequence count equal to 1 and by causing a subsequent electrical current that is larger than the predetermined minimum electrical current to be sent to the left side electrically operated valve. This subsequent electrical current will be larger than the predetermined minimum electrical current by an increment that is equal to a predetermined incremental electrical current value multiplied by the left side sequence count. Preferably, the predetermined incremental electrical current value that is employed in a left side calibration sequence is 10 mA, so that when the left side sequence count is 1, the subsequent electrical current that is sent to the left side electrically operated valve is 100 mA+(10 mA)(1)=110 mA. The calibration controller will then compare a frame attitude measurement from one or more sensors after the transmission of the subsequent electrical current when the left side sequence count is 1 to a reference measurement taken prior to the transmission of the predetermined minimum electrical current to determine if there has been a change in the attitude of the frame of the machine. If so, the calibration controller communicates to the automatic attitude control system (i.e., the MOBA™ control system) a left side electrical current set point equal to the amount of electrical current that was sent to the left side electrically operated valve which was determined by input from the at least one sensor to cause a change in the attitude of the frame of the machine. However, if the subsequent electrical current when the left side sequence count is 1 did not cause a change in the attitude of the frame of the machine, the calibration controller will continue the left side calibration sequence by increasing the left side sequence count to 2 and by causing a subsequent electrical current that is larger than the predetermined minimum electrical current to be sent to the left side electrically operated valve. This subsequent electrical current will be larger than the predetermined minimum electrical current by an increment that is equal to a predetermined incremental electrical current value multiplied by the left side sequence count. Consequently, when the left side sequence count is 2, the subsequent electrical current that is sent to the left side electrically operated valve will preferably be 100 mA+(10 mA)(2)=120 mA. The calibration controller will then compare a frame attitude measurement from one or more sensors after the transmission of the subsequent electrical current when the left side sequence count is 2 to a reference measurement taken prior to the transmission of the predetermined minimum electrical current to determine if there has been a change in the attitude of the frame of the machine. If so, the calibration controller communicates to the automatic attitude control system (i.e., the MOBA™ control system) a left side electrical current set point equal to the amount of electrical current that was sent to the left side electrically operated valve which was determined by input from the at least one sensor to cause a change in the attitude of the frame of the machine.

On the other hand, if the subsequent electrical current when the left side sequence count is 2 did not cause a change in the attitude of the frame of the machine, the calibration controller will continue the left side calibration sequence by increasing the left side sequence count to 3 and by causing a subsequent electrical current that is larger than the predetermined minimum electrical current to be sent to the left side electrically operated valve. This subsequent electrical current will be larger than the predetermined minimum electrical current by an increment that is equal to a predetermined incremental electrical current value multiplied by the left side sequence count. Consequently, when the left side sequence count is 3, the subsequent electrical current that is sent to the left side electrically operated valve will preferably be 100 mA+(10 mA)(3)=130 mA. The calibration controller will then compare a frame attitude measurement from one or more sensors after the transmission of the subsequent electrical current when the left side sequence count is 3 to a reference measurement taken prior to the transmission of the predetermined minimum electrical current to determine if there has been a change in the attitude of the frame of the machine. If so, the calibration controller communicates to the automatic attitude control system (i.e., the MOBA™ control system) a left side electrical current set point equal to the amount of electrical current that was sent to the left side electrically operated valve which was determined by input from the at least one sensor to cause a change in the attitude of the frame of the machine. If the subsequent electrical current when the left side sequence count is 3 did not cause a change in the attitude of the frame of the machine, the calibration controller will continue the iterative left side calibration sequence by increasing the left side sequence count to 4 and by causing a subsequent electrical current that is preferably larger than the predetermined minimum electrical current to be sent to the left side electrically operated valve. This iterative process will continue until the calibration controller determines that there has been a change in the attitude of the frame of the machine. In the alternative, the iterative process will continue until: (a) the calibration controller determines from input from the at least one sensor that electrical current that was sent to the left side electrically operated valve has caused a change in the attitude of the frame of the machine, or (b) an electrical current having a value that is equal to a predetermined maximum value is sent to the left side electrically operated valve during the left side calibration sequence and the calibration controller determines from input from the at least one sensor that such electrical current having a predetermined maximum value did not cause a change in the attitude of the frame of the machine, or (c) the left side sequence count reaches a predetermined maximum value. If the calibration system is set up to continue until item (a) described above occurs or item (b) described above occurs, it is preferred that the predetermined maximum value of electrical current that may be employed in the left side calibration sequence is equal to the predetermined minimum electrical current (100 mA) that is sent to the left side electrically operated valve in order to initiate a left side calibration sequence plus 250 mA, or 350 mA. If the calibration system is set up to continue until item (a) described above occurs or item (c) described above occurs, it is preferred that the predetermined maximum value of the left side sequence count is set at 50.

When the calibration sequence to determine the minimum current necessary to cause the left side linear actuator to change the attitude to the working machine in the up direction has been accomplished, additional calibration sequences will be initiated in a manner similar to that described above: (a) to determine the minimum current necessary to cause the left side linear actuator to change the attitude to the working machine in the down direction; (b) to determine the minimum current necessary to cause the right side linear actuator to change the attitude to the working machine in the up direction; and (c) to determine the minimum current necessary to cause the right side linear actuator to change the attitude to the working machine in the down direction. Of course, these calibration sequences can be carried out in any order at the preference of the machine operator.

Although this description contains many specifics, these should not be construed as limiting the scope of the invention but as merely providing illustrations of some of the presently preferred embodiments thereof, as well as the best mode contemplated by the inventors of carrying out the invention. The invention, as described and claimed herein, is susceptible to various modifications and adaptations as would be appreciated by those having ordinary skill in the art to which the invention relates.

What is claimed is:

1. A calibration system for an automatic attitude control system for a working machine having a frame, a left side linear actuator that is actuated by a left side electrically operated valve for adjusting the attitude of the frame of the machine, and a right side linear actuator that is actuated by a right side electrically operated valve for adjusting the attitude of the frame of the machine, said automatic control system comprising a controller for automatically actuating the left side linear actuator and/or the right side linear actuator of the working machine to maintain a predetermined attitude of the frame, said calibration system comprising:

(a) at least one sensor that is adapted to determine if the actuation of either the left side linear actuator or the right side linear actuator has caused a change in the attitude of the frame of the machine;

(b) a calibrating controller that is:
(i) operatively connected to the at least one sensor;
(ii) operatively connected to the left side electrically operated valve;
(iii) adapted to cause one or more sequential electrical currents to be sent to the left side electrically operated valve, to determine based on input from the at least one sensor if any such electrical current has caused a change in the attitude of the frame of the machine, and to determine a left side sequence count of the number of times that an electrical current that was caused to be sent to the left side electrically operated valve failed to cause a change in the attitude of the frame of the machine;
(iv) adapted to initiate a left side calibration sequence by causing a predetermined minimum electrical current to be sent to the left side electrically operated valve;
(v) adapted to continue the left side calibration sequence, if the previous electrical current sent to the left side electrically operated valve in the left side calibration sequence did not cause a change in the attitude of the frame of the machine, by causing a subsequent electrical current that is larger than the predetermined minimum electrical current by an increment that is equal to a predetermined incremental electrical current value multiplied by the left side sequence count to be sent to the left side electrically operated valve;

(vi) adapted to communicate to the automatic attitude control system a left side electrical current set point equal to the amount of electrical current that was sent to the left side electrically operated valve which was determined by input from the at least one sensor to cause a change in the attitude of the frame of the machine;

(vii) operatively connected to the right side electrically operated valve;

(viii) adapted to cause one or more sequential electrical currents to be sent to the right side electrically operated valve, to determine based on input from the at least one sensor if any such electrical current has caused a change in the attitude of the frame of the machine, and to determine a right side sequence count of the number of times that an electrical current that was caused to be sent to the right side electrically operated valve failed to cause a change in the attitude of the frame of the machine;

(ix) adapted to initiate a right side calibration sequence by causing a predetermined minimum electrical current to be sent to the right side electrically operated valve;

(x) adapted to continue the right side calibration sequence, if the previous electrical current sent to the right side electrically operated valve in the right side calibration sequence did not cause a change in the attitude of the frame of the machine, by causing a subsequent electrical current that is larger than the predetermined minimum electrical current by an increment that is equal to a predetermined incremental electrical current value multiplied by the right side sequence count to be sent to the right side electrically operated valve;

(xi) adapted to communicate to the automatic attitude control system a right side electrical current set point equal to the amount of electrical current that was sent to the right side electrically operated valve which was determined by input from the at least one sensor to cause a change in the attitude of the frame of the machine.

2. The calibration system of claim 1 which is adapted to:
(a) initiate a left side calibration sequence to determine the minimum current necessary to cause the left side linear actuator to change the attitude of the frame of the working machine in the up direction;
(b) initiate a left side calibration sequence to determine the minimum current necessary to cause the left side linear actuator to change the attitude of the frame of the working machine in the down direction;
(c) initiate a right side calibration sequence to determine the minimum current necessary to cause the right side linear actuator to change the attitude of the frame of the working machine in the up direction;
(d) initiate a right side calibration sequence to determine the minimum current necessary to cause the right side linear actuator to change the attitude of the frame of the working machine in the down direction.

3. The calibration system of claim 1 which includes:
(a) a left side switch that is operatively connected to the calibrating controller and adapted to initiate the left side calibration sequence;
(b) a right side switch that is operatively connected to the calibrating controller and adapted to initiate the right side calibration sequence.

4. The calibration system of claim 1 wherein:
(a) the predetermined minimum electrical current that is sent to the left side electrically operated valve in order to initiate a left side calibration sequence is equal to 100 mA;
(b) the predetermined incremental electrical current value that is employed in a left side calibration sequence is 10 mA;
(c) the predetermined minimum electrical current that is sent to the right side electrically operated valve in order to initiate a right side calibration sequence is equal to 100 mA;
(d) the predetermined incremental electrical current value that is employed in a right side calibration sequence is 10 mA.

5. The calibration system of claim 1 wherein:
(a) the left side calibration sequence will continue until:
 (i) the calibration controller determines from input from the at least one sensor that electrical current that was sent to the left side electrically operated valve has caused a change in the attitude of the frame of the machine; or
 (ii) an electrical current having a value that is equal to a predetermined maximum value is sent to the left side electrically operated valve during the left side calibration sequence and the calibration controller determines from input from the at least one sensor that such electrical current having a predetermined maximum value did not cause a change in the attitude of the frame of the machine;
(b) the right side calibration sequence will continue until:
 (i) the calibration controller determines from input from the at least one sensor that electrical current that was sent to the right side electrically operated valve has caused a change in the attitude of the frame of the machine; or
 (ii) an electrical current having a value that is equal to a predetermined maximum value is sent to the right side electrically operated valve during the right side calibration sequence and the calibration controller determines from input from the at least one sensor that such electrical current having a predetermined maximum value did not cause a change in the attitude of the frame of the machine.

6. The calibration system of claim 5 wherein:
(a) the predetermined maximum value of electrical current that may be employed in the left side calibration sequence is equal to the predetermined minimum electrical current that is sent to the left side electrically operated valve in order to initiate a left side calibration sequence plus 250 mA;
(b) the predetermined maximum value of electrical current that may be employed in the right side calibration sequence is equal to the predetermined minimum electrical current that is sent to the right side electrically operated valve in order to initiate a right side calibration sequence plus 250 mA.

7. The calibration system of claim 1 wherein:
(a) the left side calibration sequence will continue until:
 (i) the calibration controller determines from input from the at least one sensor that electrical current that was sent to the left side electrically operated valve has caused a change in the attitude of the frame of the machine; or (ii) the left side sequence count reaches a predetermined maximum value;
(b) the right side calibration sequence will continue until:
(i) the calibration controller determines from input from the at least one sensor that electrical current that was sent to the right side electrically operated valve has caused a change in the attitude of the frame of the machine; or
(ii) the right side sequence count reaches a predetermined maximum value.

8. The calibration system of claim 7 wherein:
(a) the predetermined maximum value of the left side sequence count is 50;
(b) the predetermined maximum value of the right side sequence count is 50.

9. A method for calibrating an automatic attitude control system for a working machine having a frame, a left side linear actuator that is actuated by a left side electrically operated valve for adjusting the attitude of the frame of the machine in the up and down directions, and a right side linear actuator that is actuated by a right side electrically operated valve for adjusting the attitude of the frame of the machine in the up and down directions, said automatic control system comprising a controller for automatically actuating the left side linear actuator and/or the right side linear actuator of the working machine to maintain a predetermined attitude of the frame, said method comprising:
(a) providing at least one sensor that is adapted to determine if the actuation of either the left side linear actuator or the right side linear actuator has caused a change in the attitude of the frame of the machine;
(b) providing a calibrating controller that is:
(i) operatively connected to the at least one sensor;
(ii) operatively connected to the left side electrically operated valve;
(iii) adapted to cause one or more sequential electrical currents to be sent to the left side electrically operated valve, to determine based on input from the at least one sensor if any such electrical current has caused a change in the attitude of the frame of the machine, and to determine a left side sequence count of the number of times that an electrical current that was caused to be sent to the left side electrically operated valve failed to cause a change in the attitude of the frame of the machine;
(iv) adapted to initiate a left side calibration sequence by causing a predetermined minimum electrical current to be sent to the left side electrically operated valve;
(v) adapted to continue the left side calibration sequence, if the previous electrical current sent to the left side electrically operated valve in the left side calibration sequence did not cause a change in the attitude of the frame of the machine, by causing a subsequent electrical current that is larger than the predetermined minimum electrical current by an increment that is equal to a predetermined incremental electrical current value multiplied by the left side sequence count to be sent to the left side electrically operated valve;
(vi) adapted to communicate to the automatic attitude control system a left side electrical current set point equal to the amount of electrical current that was sent to the left side electrically operated valve which was determined by input from the at least one sensor to cause a change in the attitude of the frame of the machine;
(vii) operatively connected to the right side electrically operated valve;
(viii) adapted to cause one or more sequential electrical currents to be sent to the right side electrically operated valve, to determine based on input from the at least one sensor if any such electrical current has caused a change in the attitude of the frame of the machine, and to determine a right side sequence count of the number of times that an electrical current that was caused to be sent to the right side electrically operated valve failed to cause a change in the attitude of the frame of the machine;
(ix) adapted to initiate a right side calibration sequence by causing a predetermined minimum electrical current to be sent to the right side electrically operated valve;
(x) adapted to continue the right side calibration sequence, if the previous electrical current sent to the right side electrically operated valve in the right side calibration sequence did not cause a change in the attitude of the frame of the machine, by causing a subsequent electrical current that is larger than the predetermined minimum electrical current by an increment that is equal to a predetermined incremental electrical current value multiplied by the right side sequence count to be sent to the right side electrically operated valve;
(xi) adapted to communicate to the automatic attitude control system a right side electrical current set point equal to the amount of electrical current that was sent to the right side electrically operated valve which was determined by input from the at least one sensor to cause a change in the attitude of the frame of the machine;
(c) initiating a left side calibration sequence in the up direction by causing a predetermined minimum electrical current to be sent to the left side electrically operated valve to raise the frame of the machine;
(d) determining, by input from the at least one sensor, whether the amount of electrical current sent to the left electrically operated valve caused a change in the attitude of the frame of the machine;
(e) if the amount of electrical current that was sent to the left side electrically operated valve was determined by input from the at least one sensor to cause a change in the attitude of the frame of the machine, communicating to the automatic attitude control system a left side electrical current up direction set point equal to such amount of electrical current;
(f) if the amount of electrical current that was sent to the left side electrically operated valve was determined by input from the at least one sensor not to cause a change in the attitude of the frame of the machine:
(i) determining a left side sequence count of the number of times that an electrical current that was caused to be sent to the left side electrically operated valve failed to cause a change in the attitude of the frame of the machine; and
(ii) continuing the left side calibration sequence by causing a subsequent electrical current that is larger than the predetermined minimum electrical current by an increment that is equal to a predetermined incremental electrical current value multiplied by the left side sequence count to be sent to the left side electrically operated valve;
(iii) repeating steps (f)(i) and (f)(ii) until the amount of electrical current that was sent to the left side electrically operated valve was determined by input from the at least one sensor to cause a change in the attitude of the frame of the machine, and when this condition is obtained, communicating to the automatic attitude control system a left side electrical current up direction set point equal to such amount of electrical current;

(g) initiating a left side calibration sequence in the down direction by causing a predetermined minimum electrical current to be sent to the left side electrically operated valve to lower the frame of the machine;

(h) determining, by input from the at least one sensor, whether the amount of electrical current sent to the left electrically operated valve caused a change in the attitude of the frame of the machine;

(i) if the amount of electrical current that was sent to the left side electrically operated valve was determined by input from the at least one sensor to cause a change in the attitude of the frame of the machine, communicating to the automatic attitude control system a left side electrical current down direction set point equal to such amount of electrical current;

(j) if the amount of electrical current that was sent to the left side electrically operated valve was determined by input from the at least one sensor not to cause a change in the attitude of the frame of the machine:
  (i) determining a left side sequence count of the number of times that an electrical current that was caused to be sent to the left side electrically operated valve failed to cause a change in the attitude of the frame of the machine; and
  (ii) continuing the left side calibration sequence by causing a subsequent electrical current that is larger than the predetermined minimum electrical current by an increment that is equal to a predetermined incremental electrical current value multiplied by the left side sequence count to be sent to the left side electrically operated valve;
  (iii) repeating steps (j)(i) and (j)(ii) until the amount of electrical current that was sent to the left side electrically operated valve was determined by input from the at least one sensor to cause a change in the attitude of the frame of the machine, and when this condition is obtained, communicating to the automatic attitude control system a left side electrical current down direction set point equal to such amount of electrical current;

(k) initiating a right side calibration sequence in the up direction by causing a predetermined minimum electrical current to be sent to the right side electrically operated valve to raise the frame of the machine;

(l) determining, by input from the at least one sensor, whether the amount of electrical current sent to the right electrically operated valve caused a change in the attitude of the frame of the machine;

(m) if the amount of electrical current that was sent to the right side electrically operated valve was determined by input from the at least one sensor to cause a change in the attitude of the frame of the machine, communicating to the automatic attitude control system a right side electrical current up direction set point equal to such amount of electrical current;

(n) if the amount of electrical current that was sent to the right side electrically operated valve was determined by input from the at least one sensor not to cause a change in the attitude of the frame of the machine:
  (i) determining a right side sequence count of the number of times that an electrical current that was caused to be sent to the right side electrically operated valve failed to cause a change in the attitude of the frame of the machine; and
  (ii) continuing the right side calibration sequence by causing a subsequent electrical current that is larger than the predetermined minimum electrical current by an increment that is equal to a predetermined incremental electrical current value multiplied by the right side sequence count to be sent to the right side electrically operated valve;
  (iii) repeating steps (n)(i) and (n)(ii) until the amount of electrical current that was sent to the right side electrically operated valve was determined by input from the at least one sensor to cause a change in the attitude of the frame of the machine, and when this condition is obtained, communicating to the automatic attitude control system a right side electrical current up direction set point equal to such amount of electrical current;

(o) initiating a right side calibration sequence in the down direction by causing a predetermined minimum electrical current to be sent to the right side electrically operated valve to lower the frame of the machine;

(p) determining, by input from the at least one sensor, whether the amount of electrical current sent to the right electrically operated valve caused a change in the attitude of the frame of the machine;

(q) if the amount of electrical current that was sent to the right side electrically operated valve was determined by input from the at least one sensor to cause a change in the attitude of the frame of the machine, communicating to the automatic attitude control system a right side electrical current down direction set point equal to such amount of electrical current;

(r) if the amount of electrical current that was sent to the right side electrically operated valve was determined by input from the at least one sensor not to cause a change in the attitude of the frame of the machine:
  (i) determining a right side sequence count of the number of times that an electrical current that was caused to be sent to the right side electrically operated valve failed to cause a change in the attitude of the frame of the machine; and
  (ii) continuing the right side calibration sequence by causing a subsequent electrical current that is larger than the predetermined minimum electrical current by an increment that is equal to a predetermined incremental electrical current value multiplied by the right side sequence count to be sent to the right side electrically operated valve;
  (iii) repeating steps (r)(i) and (r)(ii) until the amount of electrical current that was sent to the right side electrically operated valve was determined by input from the at least one sensor to cause a change in the attitude of the frame of the machine, and when this condition is obtained, communicating to the automatic attitude control system a right side electrical current down direction set point equal to such amount of electrical current.

10. The method of claim 9 wherein:
(a) the predetermined minimum electrical current that is sent to the left side electrically operated valve in step (c) in order to initiate a left side calibration sequence in the up direction is equal to 100 mA;
(b) the predetermined incremental electrical current value that is employed in step (f)(ii) is 10 mA;

(c) the predetermined minimum electrical current that is sent to the left side electrically operated valve in step (g) in order to initiate a left side calibration sequence in the down direction is equal to 100 mA;

(d) the predetermined incremental electrical current value that is employed in step (j)(ii) is 10 mA;

(e) the predetermined minimum electrical current that is sent to the right side electrically operated valve in step (k) in order to initiate a right side calibration sequence in the up direction is equal to 100 mA;

(f) the predetermined incremental electrical current value that is employed in step (n)(ii) is 10 mA;

(g) the predetermined minimum electrical current that is sent to the right side electrically operated valve in step (o) in order to initiate a right side calibration sequence in the down direction is equal to 100 mA;

(h) the predetermined incremental electrical current value that is employed in step (r)(ii) is 10 mA.

11. The method of claim 9 wherein:
(a) step (f)(iii) comprises repeating steps (f)(i) and (f)(ii) until the first to occur of:
  (i) the calibration controller determines from input from the at least one sensor that electrical current that was sent to the left side electrically operated valve has caused a change in the attitude of the frame of the machine; or
  (ii) an electrical current having a value that is equal to a predetermined maximum value is sent to the left side electrically operated valve during the left side calibration sequence and the calibration controller determines from input from the at least one sensor that such electrical current having a predetermined maximum value did not cause a change in the attitude of the frame of the machine;
(b) step (j)(iii) comprises repeating steps (j)(i) and (j)(ii) until the first to occur of:
  (i) the calibration controller determines from input from the at least one sensor that electrical current that was sent to the left side electrically operated valve has caused a change in the attitude of the frame of the machine; or
  (ii) an electrical current having a value that is equal to a predetermined maximum value is sent to the left side electrically operated valve during the left side calibration sequence and the calibration controller determines from input from the at least one sensor that such electrical current having a predetermined maximum value did not cause a change in the attitude of the frame of the machine;
(a) step (n)(iii) comprises repeating steps (n)(i) and (n)(ii) until the first to occur of:
  (i) the calibration controller determines from input from the at least one sensor that electrical current that was sent to the right side electrically operated valve has caused a change in the attitude of the frame of the machine; or
  (ii) an electrical current having a value that is equal to a predetermined maximum value is sent to the right side electrically operated valve during the right side calibration sequence and the calibration controller determines from input from the at least one sensor that such electrical current having a predetermined maximum value did not cause a change in the attitude of the frame of the machine;
(b) step (r)(iii) comprises repeating steps (r)(i) and (r)(ii) until the first to occur of:
  (i) the calibration controller determines from input from the at least one sensor that electrical current that was sent to the right side electrically operated valve has caused a change in the attitude of the frame of the machine; or
  (ii) an electrical current having a value that is equal to a predetermined maximum value is sent to the right side electrically operated valve during the right side calibration sequence and the calibration controller determines from input from the at least one sensor that such electrical current having a predetermined maximum value did not cause a change in the attitude of the frame of the machine.

12. The method of claim 11 wherein:
(a) the predetermined maximum value of electrical current that is employed in the left side calibration sequence in the up direction is equal to the predetermined minimum electrical current that is sent to the left side electrically operated valve in order to initiate a left side calibration sequence plus 250 mA;
(b) the predetermined maximum value of electrical current that is employed in the left side calibration sequence in the down direction is equal to the predetermined minimum electrical current that is sent to the left side electrically operated valve in order to initiate a left side calibration sequence plus 250 mA;
(c) the predetermined maximum value of electrical current that is employed in the right side calibration sequence in the up direction is equal to the predetermined minimum electrical current that is sent to the right side electrically operated valve in order to initiate a right side calibration sequence plus 250 mA;
(d) the predetermined maximum value of electrical current that is employed in the right side calibration sequence in the down direction is equal to the predetermined minimum electrical current that is sent to the right side electrically operated valve in order to initiate a right side calibration sequence plus 250 mA.

13. The method of claim 9 wherein:
(a) step (f)(iii) comprises repeating steps (f)(i) and (f)(ii) until the first to occur of:
  (i) the calibration controller determines from input from the at least one sensor that electrical current that was sent to the left side electrically operated valve has caused a change in the attitude of the frame of the machine; or
  (ii) the left side sequence count reaches a predetermined maximum value;
(b) step (j)(iii) comprises repeating steps (j)(i) and (j)(ii) until the first to occur of:
  (i) the calibration controller determines from input from the at least one sensor that electrical current that was sent to the left side electrically operated valve has caused a change in the attitude of the frame of the machine; or
  (ii) the left side sequence count reaches a predetermined maximum value;
(c) step (n)(iii) comprises repeating steps (n)(i) and (n)(ii) until the first to occur of:
  (i) the calibration controller determines from input from the at least one sensor that electrical current that was sent to the right side electrically operated valve has caused a change in the attitude of the frame of the machine; or
  (ii) the right side sequence count reaches a predetermined maximum value;

(d) step (r)(iii) comprises repeating steps (r)(i) and (r)(ii) until the first to occur of:
  (i) the calibration controller determines from input from the at least one sensor that electrical current that was sent to the right side electrically operated valve has caused a change in the attitude of the frame of the machine; or
  (ii) the right side sequence count reaches a predetermined maximum value.

14. The method of claim 13 wherein:
(a) the predetermined maximum value of the left side sequence count is 50;
(b) the predetermined maximum value of the right side sequence count is 50.

\* \* \* \* \*